Oct. 23, 1956   R. A. COVINGTON, JR., ET AL   2,767,427
TUBULAR FILM STRETCHER
Filed April 7, 1955   2 Sheets-Sheet 1
FIG. 4
FIG. 3
FIG. 1
FIG. 2
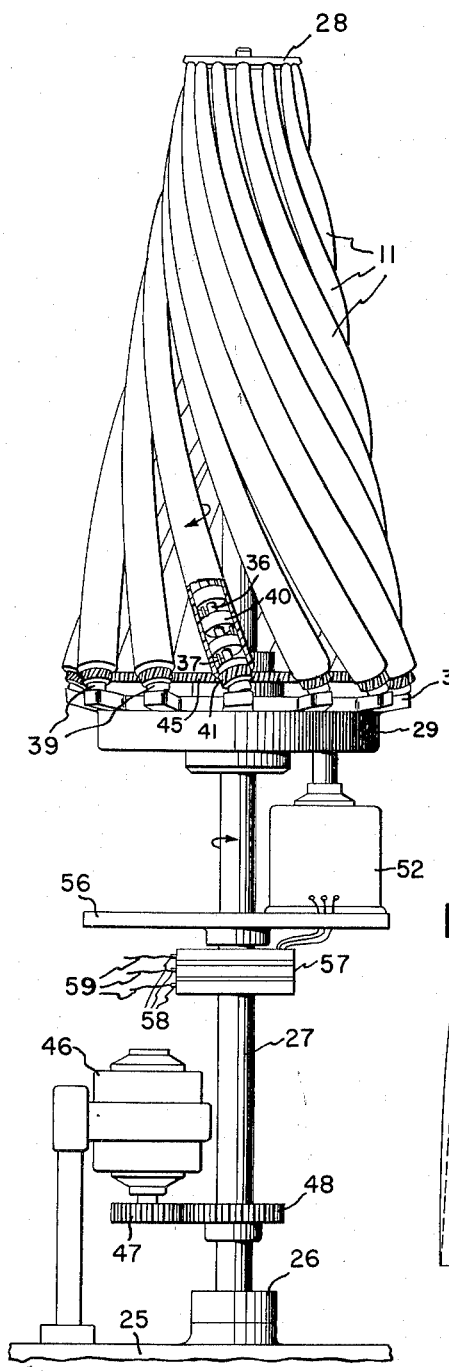
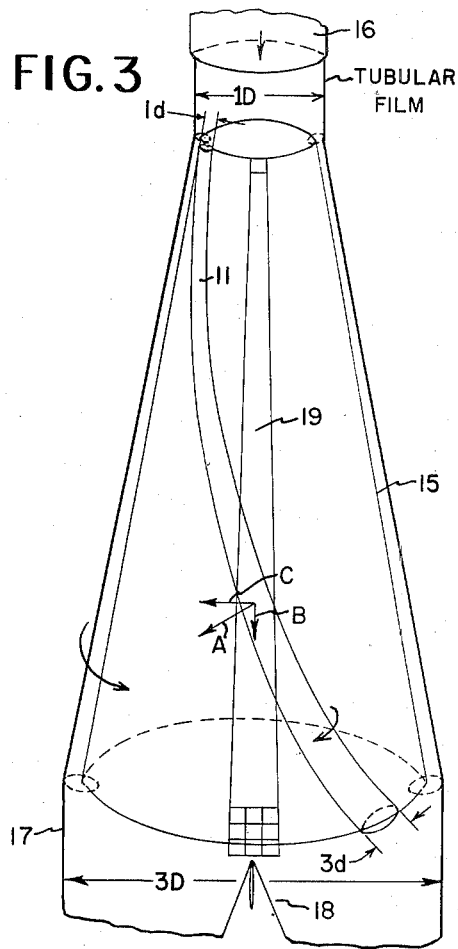
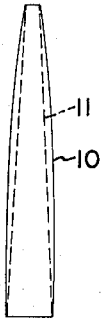
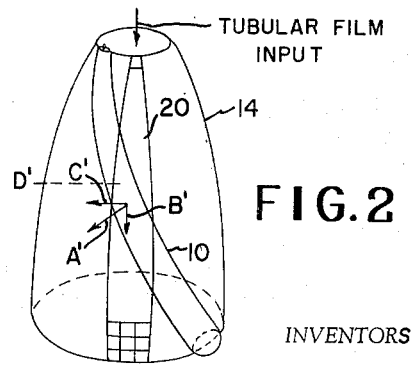
INVENTORS
ROBERT A. COVINGTON, JR.
VINCENT H. WALDIN
BY Harry J. McCauley
ATTORNEY Oct. 23, 1956 R. A. COVINGTON, JR., ET AL 2,767,427
TUBULAR FILM STRETCHER
Filed April 7, 1955 2 Sheets-Sheet 2
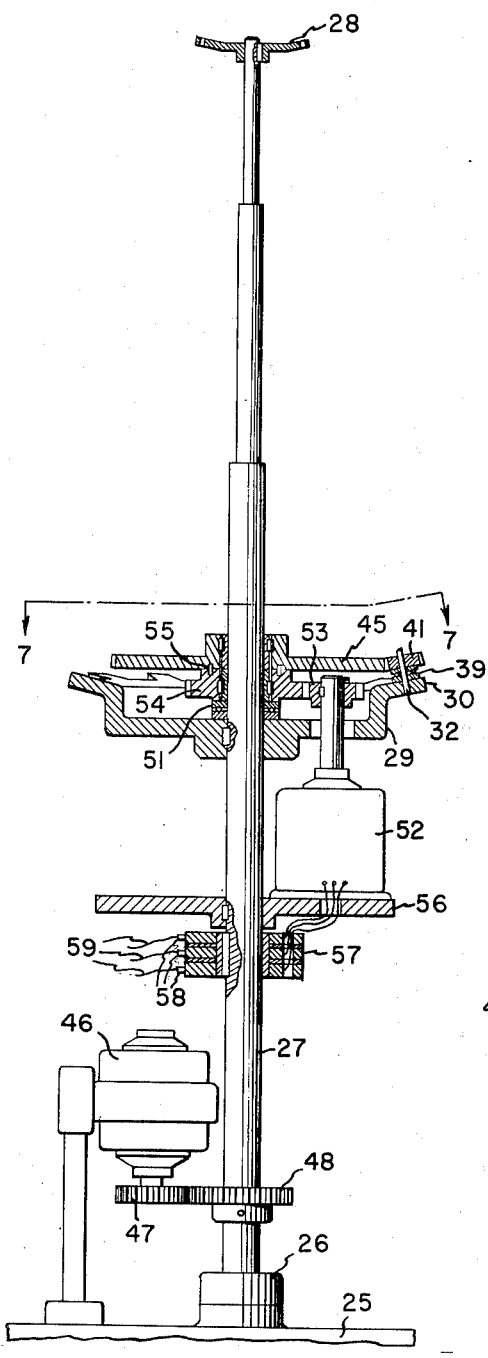
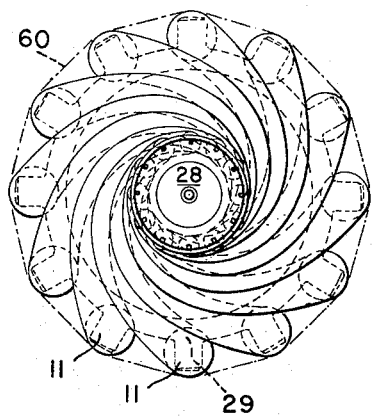
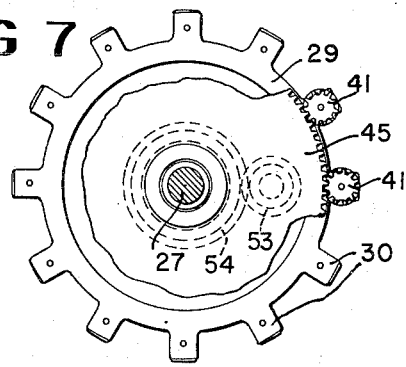
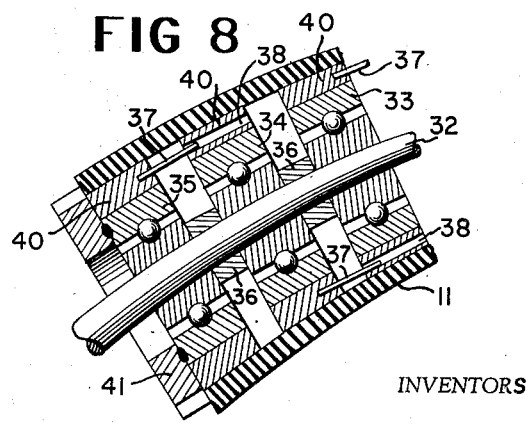
INVENTORS
ROBERT A. COVINGTON, JR.
VINCENT H. WALDIN
BY Harry J. McCauley
ATTORNEY

United States Patent Office 2,767,427
Patented Oct. 23, 1956

2,767,427

TUBULAR FILM STRETCHER

Robert A. Covington, Jr., and Vincent H. Waldin, Wilmington, Del., assignors to E. I. du Pont de Nemours and Company, Wilmington, Del., a corporation of Delaware Application April 7, 1955, Serial No. 499,825

3 Claims. (Cl. 18—1)

This invention relates to apparatus for stretching a tubular film or web, and particularly to a tubular film stretching apparatus adapted to stretch a tubular film by application of either radial stress, or radial and longitudinal stresses simultaneously, to the inside surface of the tubular film while advancing the film longitudinally and in generally concentric relationship with respect to the apparatus with the inside surface of the tube in abutment therewith.

In the manufacture of films, which term as hereinafter employed is intended to encompass webs broadly, from polymeric substances enhanced strength is often obtained by orienting the molecular structure by a drawing or stretching operation. With some materials it is possible to control the gage or thickness of the sheet by stretching the base film both longitudinally and laterally while controlling each of the stretching stresses. Controlled film stretching has hitherto been effected by apparatus in the nature of tenter frames, diverging frictional belt systems, or the like, which are adapted to process flat, single-thickness sheet material, as distinguished from tubular film stock. Stretching of tubular films has been accomplished by fluid pressure techniques, such as by applying superatmospheric pressure to the inside of the film tube while the material is in relatively soft condition upon delivery from the tube-forming apparatus.

The film-stretching apparatus known to the prior art has disadvantages as regards both flat and tubular film stock, the tenter frame and frictional belt type flat sheet stretchers being high in first cost and not adapted to controlled stretching operations in lateral and longitudinal directions simultaneously, and the fluid pressure techniques being non-uniform directionally as well as difficult in practice, since use entails operations on unsupported films. Another disadvantage of tenter frame and frictional belt type stretchers is that gripping is effected along the web edges, with the result that the web is marred or at least not stretched uniformly throughout, resulting in high edge trimming losses.

The primary object of this invention is to provide a tubular film stretcher which is adapted to a high degree of control and uniformity of stretching in both lateral and longitudinal directions. Another object of this invention is to provide a tubular film stretcher which is adapted to stretch large-diameter tubular film. Another object of this invention is to provide an apparatus capable of stretching a tubular film at a predetermined rate. Another object of this invention is to provide a film stretcher which avoids marring of the film. The manner in which these and other objects of this invention are obtained will become apparent from the detailed description and the following drawings, in which:

Fig. 1 is a side elevation view of one embodiment of a convexly formed sleeve for a film-stretching roll adapted to use according to this invention before assembly in a convergent spiral pattern on a roll structure in association with other rolls of the same shape on the apparatus support frame, the profile of a preferred embodiment of sleeve of a film-stretching roll having a uniform taper being superimposed in broken line representation, Fig. 2 is a diagrammatic perspective view showing the disposition in spiral pattern with respect to the support points of a single convexly formed film-stretching roll according to Fig. 1 and a typical paraboloid solid of revolution bounded by the convergent spiral pattern envelope defined by the axes of a multiplicity of convexly formed film-stretching rolls of the same shape, Fig. 3 is a diagrammatic perspective view showing the disposition in spiral pattern with respect to the support points of a single uniformly tapered film-stretching roll according to Fig. 1, together with a conical frustum solid of revolution bounded by the convergent spiral pattern envelope defined by the axes of a multiplicity of tapered film-stretching rolls of the same shape, the maximum lateral dimensions of the tubular web at the input and output ends of the apparatus being indicated and the slitting of the stretched web after advance off the apparatus being shown schematically, Fig. 4 is a side elevation view of a preferred embodiment of this invention having uniformly tapered film-stretching rolls arranged in a spiral pattern as shown in Fig. 3 which is adapted to stretching a continuous tubular film equally in lateral and longitudinal directions, a portion of the sleeve of one of the rolls being cut away to show the driving transmission of the roll, Fig. 5 is a top plan view of the apparatus of Fig. 4, the disposition assumed by a tubular film in process of stretching at the output end of the apparatus being indicated by broken line representation, Fig. 6 is a vertical sectional view of the support structure of the apparatus of Fig. 4, shown without the film-stretching rolls but with the drive end of a single roll detailed, Fig. 7 is a sectional view taken on line 7—7 of Fig. 6, and Fig. 8 is a sectional view of the driving end of a portion of the film-stretching roll transmission shown in the cut-away detail of Fig. 4.

Generally, the apparatus of this invention comprises a power-driven rotatable support means over which the tubular film is advanced axially and in concentric relationship therewith provided with a multiplicity of film-stretching rolls having resilient sleeves each formed similarly with progressively increasing outside diameters ranging from a minimum dimension at the tubular film input end of the apparatus to a maximum dimension at the tubular film output end, the film-stretching rolls being rotatably mounted on the support means with the axes of the rolls fixed with respect to the support means and curved in similar spiral patterns convergent in the direction of tubular film input at substantially the same angle with respect to the generatrices of a solid of revolution bounded by the spiral patterns, the angular disposition being in the range of between about 1° and about 89°, and the dimensions of the rolls and the outside limits of the film path over the apparatus being preselected in the same proportions, drive means connected with each of the rolls rotating the rolls at substantially the same angular velocity in the same direction for advance of the tubular film over the apparatus and other drive means for rotation of the support means so as to counterbalance velocity components imparted to the film by the rolls in a plane normal to the direction of tubular film input to the apparatus.

The apparatus of this invention incorporates a multiplicity of film-stretching rolls which are each shaped to stretch a tubular film advanced over the apparatus a predetermined amount longitudinally as the outside diameters of the film-stretching rolls progressively increase, while simultaneously stretching the film laterally a predetermined amount and at a predetermined rate depending on the roll profiles and the shape of the solid of revolution bounded by the convergent spiral pattern envelope defined by the multiplicity of film-stretching rolls. The term "roll," as hereinafter used, is intended to comprise the external resilient sleeve which contacts the inside surface of the tubular film to be stretched in assembly with the transmission which rotates the sleeve, all as completely set out in the detailed description.

Referring to Figs. 1–3, the resilient sleeve of a film-stretching roll, before it is assembled in spiral pattern arrangement as hereinafter described, possesses a shape ranging from a convex contour, referred to the longitudinal axis of the sleeve, such as indicated at 10, to a uniformly tapered profile, such as indicated at 11. The details of the driving transmissions for the rolls fitted with the sleeves 10 and 11 of Fig. 1 are described hereinafter in greater detail, and a preferred construction of transmission is the subject matter of applicants' copending application 499,775. It should be mentioned that the construction of the film-stretching rolls, of which the sleeves are the external elements contacting the tubular film, is such that the rolls can be disposed in a spiral configuration with respect to the axis of the machine support structure for the rolls and the rolls can, at the same time, be rotated about their individual axes so as to apply frictional forces through the roll sleeves to the tubular film, thus advancing the film axially over the outside of the apparatus.

The disposition of a film-stretching roll with a convexly formed sleeve 10 is shown diagrammatically in relationship with its support means in Fig. 2, the roll axis following a spiral pattern convergent in the direction of tubular film input, indicated by the arrow. For the device of Fig. 2 the solid of revolution bounded by the envelope defined by a multiplicity of the axes of convexly formed rolls disposed similarly to the single roll shown is the paraboloid indicated at 14.

A preferred embodiment of this invention utilizes uniformly tapered rolls, such as those provided with resilient sleeves 11 of Fig. 1, the arrangement with respect to the support means being shown diagrammatically in Fig. 3 wherein the solid of revolution bounded by the envelope of spiral patterns defined by the roll axes is the frustum of the cone indicated at 15.

It will be understood that the axes of the rolls of different apparatuses may be arranged in a great number of different spiral patterns convergent in the direction from which the tubular film is supplied to the apparatus and that the envelopes of the spiral patterns defined by the roll axes will each bound a characteristic solid of revolution, the paraboloid 14 of Fig. 2 and the conical frustum 15 of Fig. 3 being merely representative of two particular solids of revolution which possess special advantages from the film manufacturing standpoint.

It is essential to the proper operation of the apparatus of this invention that all of the rolls of each particular apparatus be disposed at substantially the same angle with respect to the generatrices of the solids of revolution bounded by the spiral patterns characteristic of the particular apparatus, e. g., paraboloid 14 of Fig. 2 and cone frustum 15 of Fig. 3, and that this angle be within the range of about 1° to about 89°. It is preferred to employ dispositions at angles larger than about 30°, because, the larger these angles are, the greater is the rate of film throughput and consequently of product manufactured, and also the larger this angle is the greater is the number of contacts between the film and the rolls along lines parallel to the elements of the solids of revolution. Disposition of the roll axes at angles greater than 30°, however, complicates the problem of shaft support and the maintenance of shaft stiffness during operation, for which reasons dispositions of the shafts at 30° or slightly more is preferred.

The construction of a preferred embodiment of apparatus utilizing uniformly tapered film-stretching rolls, having axes disposed in the pattern represented in Fig. 3, is shown in Figs. 4–8, this apparatus being designed for input of the film from the top with exit of the stretched film below the rolls, followed by slitting to a plane sheet, and thereafter withdrawing the film to subsequent processing apparatus without interference from the machine supports and powering devices.

As shown in Figs. 4 and 6 particularly, the apparatus comprises a base plate 25 provided with a thrust bearing 26 in which is journaled the vertical main shaft 27. The main shaft supports the film-stretching rolls, the driving means for these rolls and the immediate structures on which the rolls are mounted.

The film-stretching rolls are supported by an upper circular plate member 28 and a lower circular plate member 29, both of which are keyed to shaft 27 and consequently rotate in unison therewith. The construction of the film-stretching rolls is such that the roll shafts are fixedly secured to plates 28 and 29, with the axes disposed in spiral patterns lying along the surface of the frustum of a cone and converging in the direction of film input, the rolls being rotatably mounted with respect to the roll shafts. A preferred construction of the rolls utilizes a transmission incorporating a plurality of bearings as the journaling means between the roll sleeves and shafts by employing the arrangement detailed in Figs. 4 and 8, which transmission is the subject matter of copending application 499,775, hereinbefore referred to.

As shown in Fig. 4, the roll shafts 32 are preformed to the shape of the spiral pattern in which it is desired to dispose the rolls, the ends of the shafts being fixedly secured to plates 28 and 29, as by providing the shafts with square ends engaging with mating holes in the plates. It may be convenient as an aid in orienting the shafts properly to provide plate 29 with a serrated upper edge as shown in Figs. 6 and 7 affording individual inclined faces 30 for support of the shafts. Each film-stretching roll is preferably provided with a thrust bearing 39 interposed between the roll drive gears 41 and faces 30.

Since the load on shafts 32 increases in the direction of film advance, it is preferred to utilize tapered shafts as shown in Fig. 8 for the support of the rolls, or to employ shouldered shafts having cross sections in different regions proportioned to the average loads which are imposed during service. Referring to Fig. 8 the roll driving transmission comprises a multiplicity of conventional bearing assemblies 33, 34 and 35 separated one from another by spacers 36, the inner races of which may be tight on shaft 32, while the outer races are free to rotate around the shaft, the spacing of successive bearings being sufficient to avoid interference therebetween.

The outer races of the bearings are preferably provided with metal sleeves 40 which are shrunk on or otherwise fixedly secured to the outside races. The outer peripheries of the metal sleeves 40 are preferably tapered inwardly in the direction of the top ends of the rolls to more snugly fit the inside bores of the sleeves 11, which can be conveniently manufactured by molding synthetic elastomers to a uniform taper inside and out. Metal sleeves 40 are provided with one or more drive pins 37 which register with mating cylindrical passages 38 on adjacent sleeves so that, as the outer bearing races and their associated metal sleeves rotate from a position of maximum separation, the ends of the drive pins are free to move axially without interference. The transmission bearings, such as 33, 34 and 35, are preferably of the sealed-in lubricant type to eliminate servicing after installation and may employ silicone type lubricants where relatively high temperature duty is required.

An alternate design of roll driving transmission can utilize a flexible hollow cable in place of the bearings represented at 33–35, the cable being supported internally by the roll shafts 32 in a construction resembling the conventional speedometer tube drives which are standard automobile equipment.

Each roll is provided with a drive gear 41 which is welded or otherwise fixedly secured to the lower end of the outer race of the lowermost bearing 35. As shown in Figs. 4 and 8, gears 41 are disposed clear of the lower ends of sleeves 11 and also of the tubular web drawn over the apparatus, and engage with bull gear 45 journaled on main shaft 27. The drive described involves a pair of non-intersecting shafts and thus requires the use of gearing such as that available commercially from the Vinco Corp., Detroit, Michigan, under the trade name "Beveloid."

As hereinafter described, the film-stretching rolls rotate about their axes in a direction opposite to the rotation of the main supporting structure inclusive of plates 28 and 29. A convenient driving arrangement includes a shaft driving motor 46 provided with a drive pinion 47 which engages with gear 48 keyed to shaft 27. A second motor 52 is provided for the drive of the individual rolls, the shaft of this motor carrying drive pinion 53 engaging with gear 54 secured to bull gear 45, journaled on shaft 27, by keys 55. A thrust bearing 51 is provided to take the downward load imposed by gears 45 and 54 on lower plate member 29. The drive motor 52 is mounted on a rotatable platform member 56 keyed to shaft 27. The power for motor 52 is supplied through the conventional three-ring commutator assembly indicated generally at 57, which is provided with stationary brushes 58 connected to a suitable power supply through leads 59.

It will be understood that the length of the roll sleeves measured over the outside limits of the spiral course of the roll shafts is greater than the length of the sleeves measured over the inside limits of the spiral course of the roll shafts and, accordingly, the roll sleeves must be fabricated from material sufficiently resilient to accommodate for this difference in lengths. A great variety of elastomeric materials are suitable for the purpose, the chief requirements, in addition to accommodation in shape during rotation around a spirally disposed axis, being that the material be relatively incompressible in the course of stretching the film and possess a coefficient of friction sufficient to preclude slippage of the film relative to the sleeve. For the usual service necessitating the employment of elevated temperatures for relaxation of the film during the stretching process, silicone rubber is completely satisfactory. It is well known that the service life of elastomers is adversely affected by the repetitive application of tensile and compressive loads and it is therefore preferred that the sleeves be mounted on the transmissions so that slight tension exists on the sleeves even along the short length portions of their expanses.

Sleeves may be molded to the desired shape previous to assembly and then pulled over the transmission assemblies or may, in fact, be molded directly on the transmissions using a cloth or other flexible backing to prevent entrance of the flowable elastomer to the interspaces between successive bearing units. The sleeve profiles may be finished to desired final shape by cutting or abrading either prior to or after the sleeves are assembled on the associated transmissions.

Referring to Fig. 3 and Figs. 4–8 it will be understood that, in operation, tubular film is supplied to the apparatus of this invention from a source of supply such as extruder 16 and enters the apparatus in the direction of the arrow. Operation of the apparatus of this invention entails stretching the tubular film by the application of frictional stresses on the inside of the tube through the rotation of the film-stretching rolls around their spirally disposed axes, while at the same time counterbalancing any velocity components which tend to displace the films circumferentially of the apparatus.

The tubular film is, of course, flexible and is drawn over the outside of the apparatus in generally concentric relationship therewith, assuming a polygonal cross-sectional configuration such as shown for the output end of the apparatus at 60 in Fig. 5. The operation of the uniformly tapered roll embodiment of the invention is somewhat more easily visualized than that of the convexly shaped roll embodiment and will accordingly be described first with particular reference to Fig. 3.

At the outset, it should be mentioned that a definite dimensional relationship must exist as regards the individual film-stretching rolls and the complete apparatus assembly for every roll configuration which can be utilized. This relationship is that the diameters of the rolls and the spiral patterns in which the roll axes are disposed are preselected so that the radii of the rolls at any predetermined point along the axes of the rolls are in the same ratio to the radii of the rolls at the tubular film input end of the apparatus as the ratio of the radius of a circle circumscribing the apparatus at the same predetermined point is to the radius of a circle circumscribing the apparatus at the tubular film input end of the apparatus. The necessity for this relationship will become clear from the following analysis of operation.

As shown in Fig. 3, if the roll carrying sleeve 11 rotates about its axis, which is constrained from rotation by attachment at the upper and lower ends to the support structure, it will be apparent that each roll will apply velocity components to the inside surface of the enveloping web, indicated generally at 17. The resultant velocity at a particular point under consideration is that indicated at A, which lies in a plane normal to the axis of the roll. The direction of the velocity vector A changes progressively from near-lateral at the upper end of the roll to near-longitudinal at the lower end of the roll due to the fact that the roll axis is spirally disposed. Vector A can, however, be resolved into its components lying in the plane of the central axis of the device, i. e., vector B, and in a plane normal to the central axis, i. e., vector C. To avoid twisting the tubular film in the course of stretching it is necessary to advance the film linearly, that is, parallel to the elements of the frustum of the cone 15 defined by the roll axes, or along a path such as that indicated generally at 19 running from the entrance to the exit end of the apparatus, while effecting predetermined amounts of lateral and longitudinal stretching, depending on the dimensions of the apparatus. Linear translation is effected by the precise counterbalancing of all velocity components C by rotation of the support structure at exactly the correct velocity in the reverse direction to the rotation of the film-stretching rolls, so that the only net velocity imparted to the tubular film will be that represented by longitudinally directed vector B. Under these circumstances rotation of the rolls will accomplish longitudinal stretching exclusively, while lateral stretching will be in the ratio of the radii of the circles corresponding to the tubular film cross sections at the output and input ends of the apparatus. The apparatus represented diagrammatically in Fig. 3 has a numerical ratio of roll diameters at top and bottom of three and a numerical ratio of frustum radii at top and bottom of three, thus the tubular film is stretched uniformly by a factor of three both linearly and longitudinally in its process through the apparatus and this is illustrated by the modular representations at the beginning and end of path 19. Apparatus constructed similarly, but to different ratio relationships, accomplishes equal lateral and longitudinal stretching of the film in characteristic degree depending on the dimensional relationship preserved.

The operation of the convexly-shaped roll embodiment of Fig. 2 is in all respects the same as that of the uniformly tapered roll embodiment of Fig. 3, except that the stretching of the film is accomplished non-linearly, as indicated by the bowing of the lines defining path 20. Thus, at point D', which is less than half way down the length of paraboloid 14, approximately 70% of the stretching is completed. In this embodiment it is, of course, necessary to counterbalance velocity component C' in order to achieve linear translation parallel to generatrices of the paraboloid and thereby avoid twisting of the film in process and this is readily accomplished provided that the dimensional relationship of rolls and roll axis disposition is maintained as hereinbefore specified.

Stretched film delivered from apparatus constructed according to this invention is slit into a flat sheet as indicated at 18 and the sheet trained off out of contact with the appurtenances at the machine base for winding on receiving mandrels or similar devices not shown.

The apparatus detailed in Figs. 4-8 is provided with twelve film-stretching rolls and this number has proved entirely adequate for the three-fold stretching of typical polymeric film materials, such as polyethylene and the like; however, greater or lesser numbers of rolls can be employed, depending on the objectives sought. The principal use of apparatus constructed as hereinabove described is undoubtedly the stretching of film and in such employment it will be understood that the material delivery of extruder 16 must be coordinated with the delivery rate at which the apparatus is operated, so that there is little or no longitudinal drag on the plastic supplied from the extruder. However, the invention is also adapted to lateral stretching solely, as distinguished from the combined lateral and longitudinal stretching described in connection with the processing of continuous length tubing, as will occur when relatively short length bands of elastomeric material are supplied to the apparatus. In the latter case the bands will be in contact with such a limited roll surface longitudinally that the film contracts in successive increments in a longitudinal sense in the course of radial stretching and the overall stretch imparted is solely lateral. Certain operations such as the stretching of elastic sealing bands for placement over the covers and necks of glass jar containers and the like may thus be effected by stretching short length bands on tubular film stretching apparatus constructed according to this invention.

It is oftentimes desirable to maintain the temperature of the tubular film at a higher level than room temperature during stretching, and this can be conveniently accomplished by enclosing the upper part of the apparatus, including the stretching rolls, within a housing which is either provided with radiant heaters or through which is circulated heated air to effect quick heating of the web in process. Furthermore, it may be desirable to receive the freshly stretched tubular film on a supporting advancing apparatus which positively removes the stretched tube to a later point where it is slit but which effects no further stretching of the film. A suitable design of advancing apparatus is disclosed in the applicants' copending application 499,826, wherein a multiplicity of helically disposed cylindrical type rolls are carried by a rotary support structure devised similarly to the apparatus of this invention. If desired, the non-stretching tubular web advancing mechanism can be made integral with the stretching apparatus by extending the stretching rolls in helical pattern beyond the zone of stretching while retaining the roll diameters constant, thus providing an unusually compact design of apparatus. With the latter construction, it will be understood that the rolls can be driven from the main shaft of the apparatus by a single bull gear as has already been described for the tubular web stretcher apparatus.

From the foregoing it will be understood that the tubular web stretcher of this invention can be modified in many ways without departure from the essential spirit of the invention, wherefor it is desired to be limited only by the scope of the following claims.

What is claimed is:

1. An apparatus for stretching a tubular film by advancing the film axially thereover in generally concentric relationship therewith comprising in combination a power-driven rotatable support means, a multiplicity of rolls provided with external resilient sleeves and formed in progressively increasing diameter ranging from a minimum dimension at the tubular film input end of the apparatus to a maximum dimension at the tubular film output end of the apparatus, said rolls being rotatably mounted on said support means with the axes of said rolls fixed with respect to said support means and curved in spiral patterns convergent in the direction of tubular film input at substantially the same angle with respect to the generatrices of a solid of revolution bounded by said spiral patterns, said angle being in the range of between about 1° and about 89°, the external diameters of said rolls and the spiral patterns of said axes being preselected so that the radii of said rolls at any predetermined point along the axes of said rolls bear a ratio to the radii of said rolls at said tubular film input end of said apparatus substantially equal to the ratio of the radius of a circle circumscribing said apparatus at said predetermined point to the radius of a circle circumscribing said apparatus at said tubular film input end of said apparatus, first driving means revolving each of said rolls at substantially the same angular velocity in the same direction for advance of said tubular film over the apparatus and second driving means revolving said support means in a direction opposite to the direction of rotation of said rolls and at an angular velocity such as to counterbalance precisely all velocity components in planes normal to the direction of tubular film input imparted to said tubular film by contact of said rolls with the interior surface of said tubular film.

2. An apparatus for stretching a tubular film by advancing the film axially thereover in generally concentric relationship therewith comprising in combination a power-driven rotatable support means, a multiplicity of rolls provided with external resilient sleeves and tapered in diameter uniformly from a minimum dimension at the tubular film input end of the apparatus to a maximum dimension at the tubular film output end of the apparatus, said rolls being rotatably mounted on said support means with the axes of said rolls fixed with respect to said support means and curved in spiral patterns convergent uniformly in the direction of tubular film input at substantially the same angle with respect to the generatrices of the frustum of a cone bounded by said spiral patterns, said angle being in the range of between about 1° and about 89°, the radii of said rolls at any predetermined point along the axes of said rolls bearing a ratio to the radii of said rolls at said tubular film input end of said apparatus substantially equal to the ratio of the radius of a circle circumscribing said apparatus at said predetermined point to the radius of a circle circumscribing said apparatus at said tubular film input end of said apparatus, first driving means revolving each of said rolls at substantially the same angular velocity in the same direction for advance of said tubular film over the apparatus, and second driving means revolving said support means in a direction opposite to the direction of rotation of said rolls and at an angular velocity such as to counterbalance precisely all velocity components in planes normal to the direction of tubular film input imparted to said tubular film by contact of said rolls with the interior surface of said tubular film.

3. An apparatus for stretching a tubular film by advancing the film axially thereover in generally concentric relationship therewith comprising in combination a central shaft, powered means in rotational driving connection with said central shaft, a first circular member of diameter less than the inside diameter of said tubular film in the unstretched state fixedly secured to said central shaft, a second circular member of diameter greater than the diameter of said first circular member disposed axially of said central shaft in the direction of tubular film output and fixedly secured to said central shaft, a multiplicity of rolls provided with external resilient sleeves and tapered in diameter uniformly from a minimum dimension at the tubular film input end of the apparatus to a maximum dimension at the tubular film output end of the apparatus, each of said rolls being rotatably mounted on individual stationary shafts curved in spiral patterns convergent uniformly inwardly in the direction of tubular film input at substantially the same angle with respect to the generatrices of the frustrum of a cone bounded by said spiral patterns, said angle being in the range of between about 1° and about 89°, the ends of said last-mentioned shafts at said input end of the apparatus being fixedly secured to said first circular member and the ends of said last-mentioned shafts at said output end of the apparatus being fixedly secured to said second circular member, the radii of said rolls at any predetermined point along the axes of said rolls bearing a ratio to the radii of said rolls at said tubular film input end of said apparatus substantially equal to the ratio of the radius of a circle circumscribing said apparatus at said predetermined point to the radius of a circle circumscribing said apparatus at said tubular film input end of said apparatus, first driving means revolving each of said rolls at substantially the same angular velocity in the same direction for advance of said tubular film over the apparatus and second driving means revolving said central shaft and said first and second circular members in a direction opposite to the direction of rotation of said rolls and at an angular velocity such as to counterbalance precisely all velocity components in planes normal to the direction of tubular film input imparted to said tubular film by contact of said rolls with the interior surface of said tubular film.

References Cited in the file of this patent
UNITED STATES PATENTS

| | | |
|---|---|---|
| 1,697,830 | Isherwood | Jan. 1, 1929 |
| 2,144,356 | Alles | Jan. 17, 1939 |
| 2,626,422 | Lammertse | Jan. 17, 1953 |
| 2,695,420 | Longstreth et al. | Nov. 30, 1954 |